United States Patent [19]

Teranishi et al.

[11] Patent Number: 4,850,536
[45] Date of Patent: Jul. 25, 1989

[54] LIQUID EJECTION APPARATUS

[75] Inventors: Nobutoyo Teranishi, Toyonaka; Yasukuni Goshoo, Nara; Yoshio Ishigaki, Yao; Hiroshi Satoh, Hirakata; Masao Morishita, Toyonaka, all of Japan

[73] Assignee: Arimitsu Industry Co., Ltd., Osaka, Japan

[21] Appl. No.: 107,417

[22] Filed: Oct. 13, 1987

[30] Foreign Application Priority Data

| Oct. 14, 1986 | [JP] | Japan | 61-245063 |
| Nov. 14, 1986 | [JP] | Japan | 61-175759 |
| Nov. 14, 1986 | [JP] | Japan | 61-175760 |
| Dec. 11, 1986 | [JP] | Japan | 61-191121 |

[51] Int. Cl.$^4$ ............ B05B 9/04; G02B 6/38
[52] U.S. Cl. ............ 239/332; 239/135; 239/526; 137/565; 222/190; 350/96.2; 350/96.21; 455/603
[58] Field of Search ............ 239/526, 525, 332, 337, 239/335, 135; 955/603, 606; 350/96.20, 96.21; 318/640, 480; 137/565; 222/333, 190, 145

[56] References Cited

U.S. PATENT DOCUMENTS

| 3,226,030 | 12/1965 | Rossi | 239/135 |
| 3,421,694 | 1/1969 | Muller | 239/335 |
| 3,438,580 | 4/1969 | Siebring | 239/135 |
| 3,885,739 | 5/1975 | Tuttle | 239/526 |
| 3,993,250 | 11/1976 | Shure | 239/332 |
| 4,176,793 | 12/1979 | Heinrich | 239/526 |
| 4,313,226 | 1/1982 | Blackington | 455/603 |
| 4,359,672 | 11/1982 | Hart | 318/16 |
| 4,563,162 | 1/1986 | Ishimoto | 455/603 |
| 4,741,590 | 5/1988 | Caron | 350/96.2 |

Primary Examiner—Andres Kashnikow
Assistant Examiner—Christopher G. Trainor
Attorney, Agent, or Firm—Stevens, Davis, Miller & Mosher

[57] ABSTRACT

A liquid ejection apparatus which is provided with a body thereof, a liquid ejector having a nozzle, and a liquid feed pipe, disposes an optical fiber along the liquid feed pipe, so that an optical signal is transmitted from a light emitting element to a light receiving element via the optical fiber. The liquid ejector is provided with a control unit for controlling transmission and cut off of the optical signal, thereby enabling remote control from the liquid ejector of operating equipments provided at the apparatus body.

4 Claims, 11 Drawing Sheets

FIG. 17
FIG. 18
FIG. 19
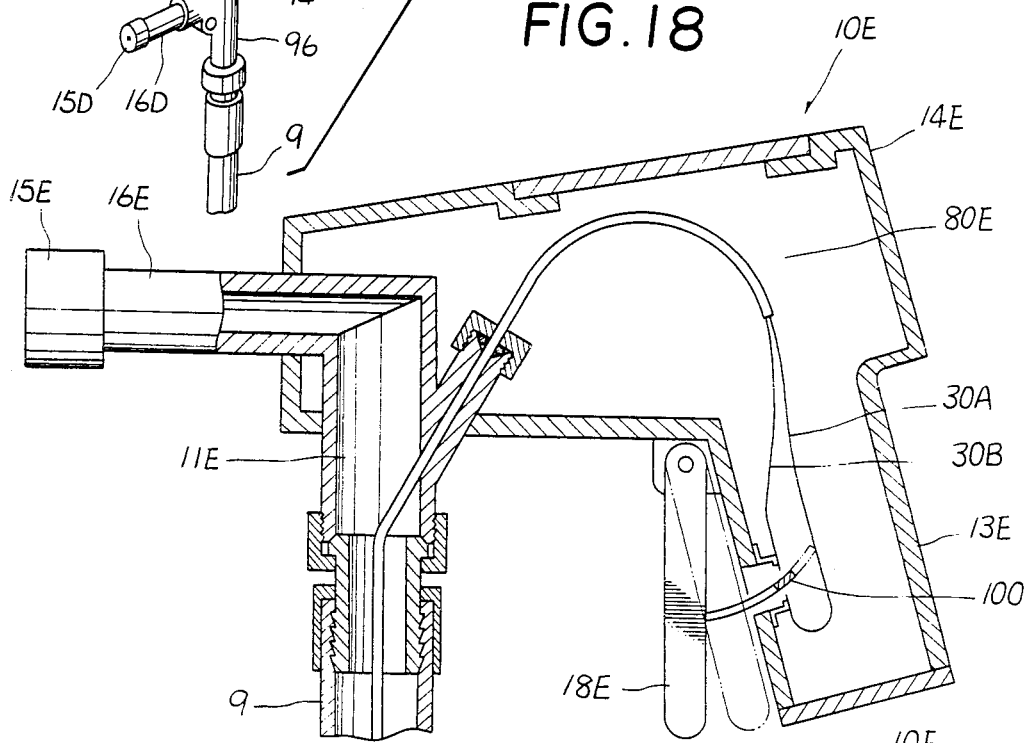
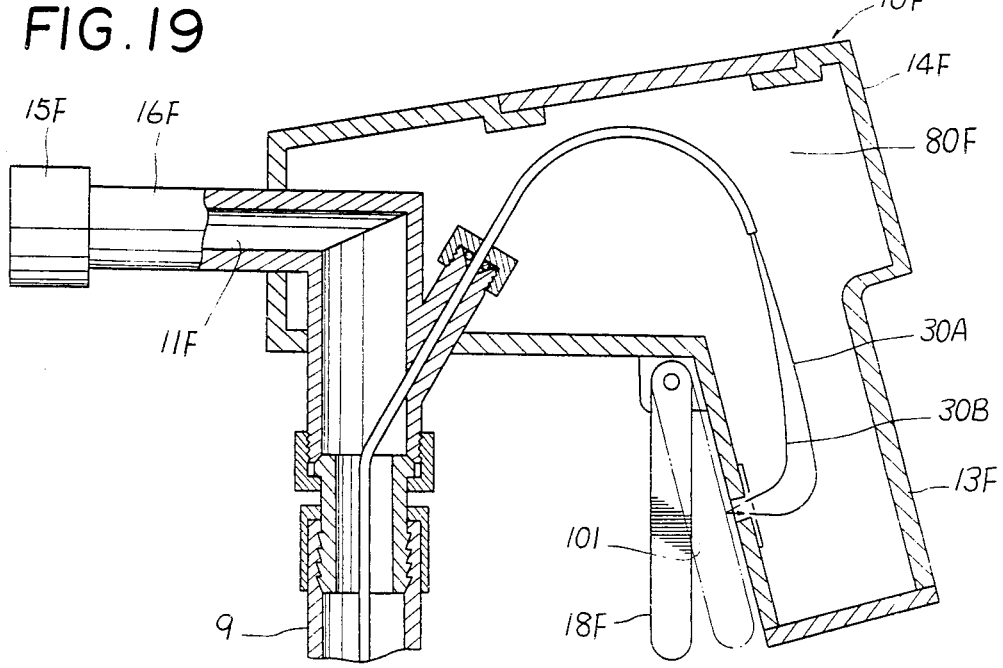

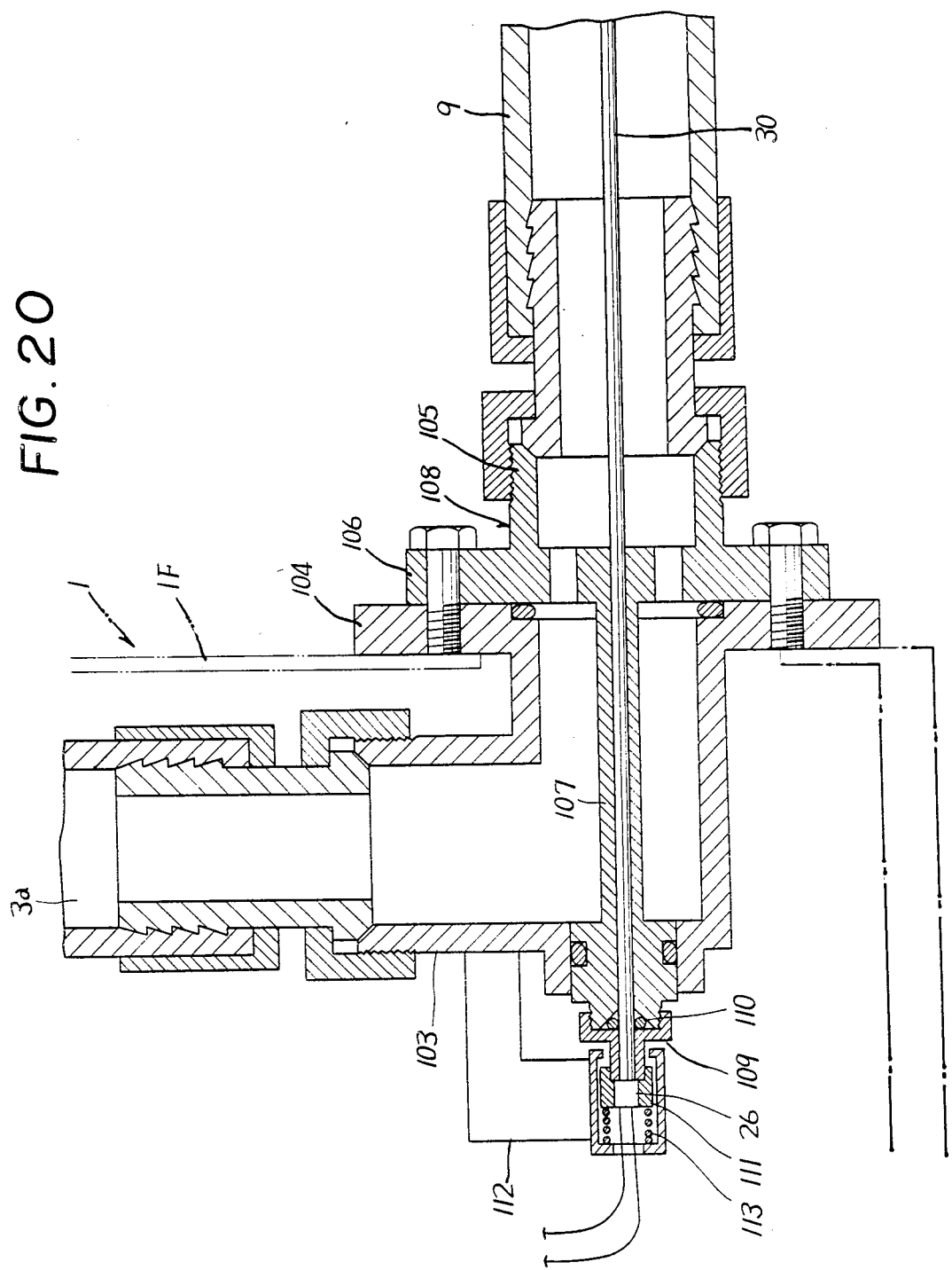

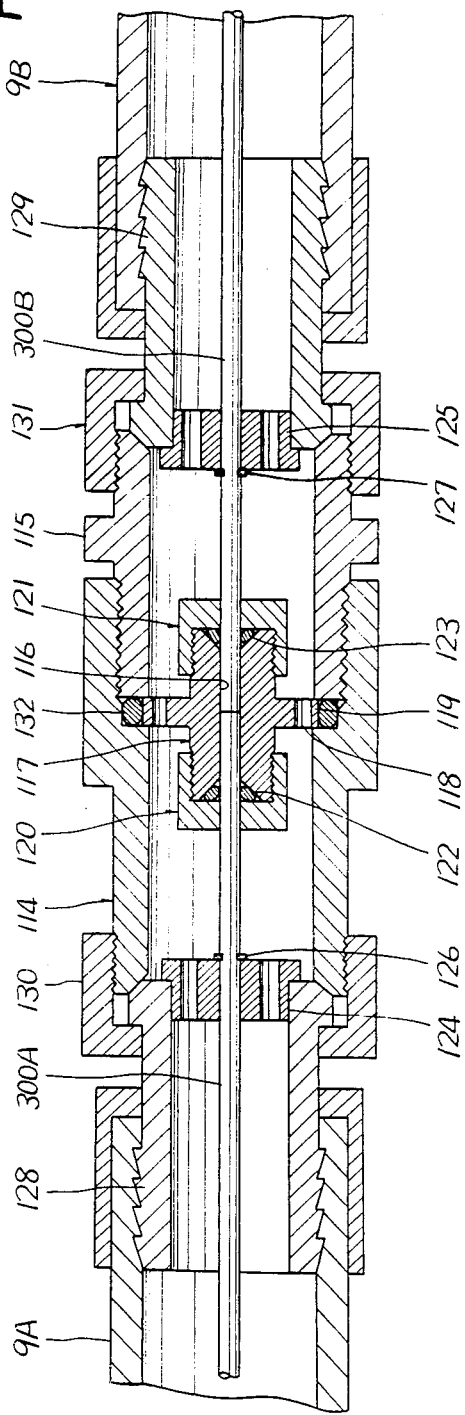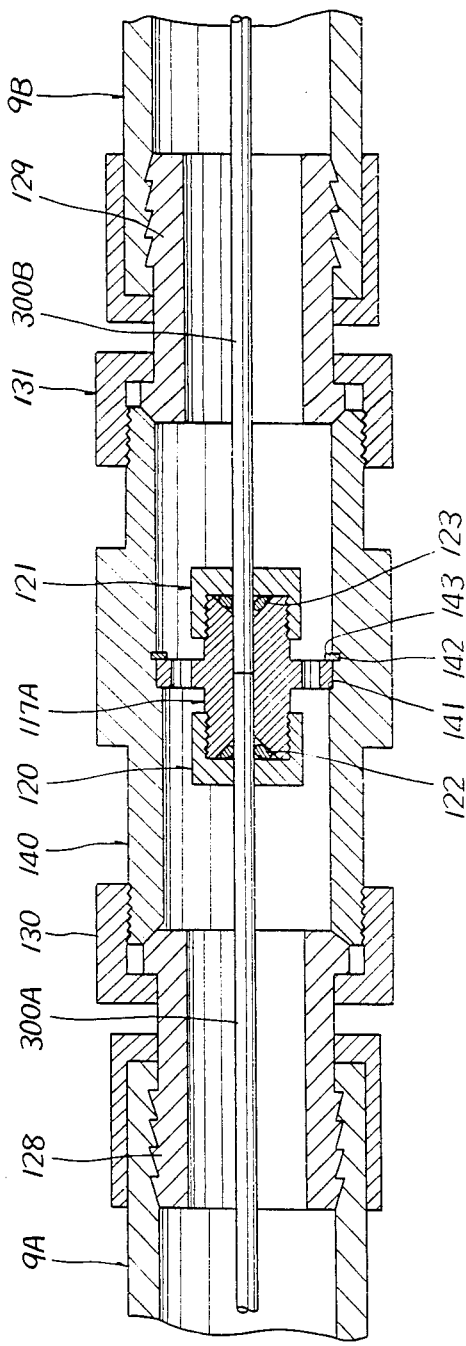

LIQUID EJECTION APPARATUS

FIELD OF THE INVENTION

The present invention relates to a liquid ejection apparatus mainly for a washing solvent, and more particularly, to a liquid ejection apparatus provided with an apparatus body having electrically operating instruments including a pump, a liquid ejector having a nozzle, and a liquid feed pipe connecting the pump and liquid ejector, so that the nozzle of the liquid ejector ejects the liquid to thereby enable washing of, for example, automobiles and also the liquid ejector can provide remote-control operation of the apparatus body.

BACKGROUND OF THE INVENTION

Conventionally, this kind of liquid ejection apparatus is well-known which provides remote-control, at the nozzle side, of the start and stop of a motor for driving the pump, ejection pressure for the liquid ejected from the nozzle, or a mixing ratio of medicine to be mixed with the liquid ejected from the same. There is one such liquid ejection apparatus, which uses a pressure switch. Such apparatus is provided on the liquid feed pipe with a check valve so that, when the nozzle is closed during the ejection of liquid from the nozzle, pressure higher than the ejection pressure from the nozzle is adapted to be generated, a pressure switch for detecting pressure within the liquid feed pipe between the check valve and the nozzle is provided so that a detection signal from the pressure switch controls, for example, an operation controller for starting and stopping a motor, the high pressure when the nozzle is closed is detected by the pressure switch to stop operation of the motor, and the pressure switch detects low pressure in the liquid feed pipe due to release of the nozzle, thereby driving the motor.

Another construction is that the liquid ejector having the nozzle is provided with switches so that conductive wires connect the switches with the motor, a pressure control valve for controlling ejection pressure of the liquid ejected from the nozzle, and a solenoid valve for controlling a medicine mixing ratio, the switches being operated to control the operating equipment, such as the motor and solenoid valve.

In a case where the conventional apparatus controls the motor or the solenoid valve through the conductor wire, a problem exists in that disconnection of the conductor wire causes electrical current leakage at the liquid feed pipe, and the liquid feed pipe side portion becomes heavy. In a case where the pressure switch controls the operating instrument, such as the motor, the nozzle is closed to stop the liquid ejection while driving the pump, whereby the liquid feed pipe, check valve and open-close valve for the nozzle, are always subjected to pressure higher than the ejection pressure during closing of the nozzle, resulting in that the liquid feed pipe and check valve have a short life span. Also, when a leakage occurs at a check valve joint and a nozzle joint at the liquid feed pipe, the liquid feed pipe has a low internal pressure during closing of the nozzle, so that the pressure switch malfunctions to drive the motor and pump by mistake.

SUMMARY OF THE INVENTION

A main object of the invention is to provide a liquid ejection apparatus which can accomplish remote-control operation of operating equipment, such as a motor for a pump and a solenoid valve, eliminate leakage at the liquid feed pipe, and make the liquid feed pipe light in weight, and which need not conserve high pressure within the liquid feed pipe.

The present invention is characterized in that the liquid ejection apparatus, provided with its body having electrically operating equipment including a pump, a liquid ejector having a nozzle, and a liquid feed pipe through which the pump at the apparatus body communicates with the liquid ejector, is provided with an optical fiber disposed between the apparatus body and the liquid ejector along the liquid feed pipe, a light emitting element for transmitting an optical signal to the optical fiber, and a light receiving element disposed at the apparatus body and receiving an optical signal propagated in the optical fiber. The apparatus body is provided with an operation control unit which converts into an electric signal the optical signal received by the light receiving element to thereby control the operation of operating instrument at the apparatus body, and the liquid ejector is provided with control means to on-off control the optical signal to be transmitted to the light receiving element.

Accordingly, the present invention uses the optical fiber and can remote-control the operation control unit at the apparatus body by means of optical communication from the liquid ejector. Hence, an electrical leakage as in the conventional example using the conductor wire can be completely eliminated, the liquid ejection apparatus of the invention can be light in weight, and pressure-tight strength of the liquid feed pipe can be reduced more than the use of the pressure switch, thereby increasing the degree of freedom for selecting materials and being advantageous in manufacturing costs.

Another characteristic of the invention is that the liquid ejector is provided with a light emitting element, a power source, a power circuit for the light emitting element, and switches as the control means.

The present invention includes a liquid ejection apparatus provided at the body thereof with the light emitting element, but when the same is provided at the liquid ejector, one optical fiber need only be used, thereby being advantageous in manufacturing costs to that extent.

Still another characteristic of the invention is that the liquid ejector is provided with an open-close valve for cutting off communication with a lance at a liquid ejection conduit.

The open-close valve is provided so that, when the optical signal is cut off to stop the operating equipment, such as the pump, the liquid ejection conduit can be cut off, thereby eliminating a flow or a leakage of useless liquid from the nozzle and preventing the liquid from being carelessly ejected from the nozzle due to a malfunction.

A further characteristic of the invention is that one light emitting element and one light receiving element are used to enable operation control of a plurality pieces of operating equipment.

In this embodiment, a plurality of control means corresponding to the plurality of pieces of operating equipment are operated to flicker the light emitting element in a pulsating manner to thereby transmit optical signals corresponding to the respective pieces of operating equipment, the liquid ejector being provided with a transmission control circuit for controlling the optical signals output from the light emitting element, as well as the power source and light emitting element, the apparatus body being provided with an output circuit which discriminates the optical signals output from the light emitting element and received by the light receiving element through the optical fiber, converts the optical signals into electric signals, and outputs them.

Still a further characteristic of the invention is to provide a construction for taking out the optical fiber from the liquid ejector or the apparatus body and a joint construction at the liquid feed pipe, which construction will be discussed in detail below in accordance with the embodiments shown in the drawings.

The above and further objects and novel features of the invention will be more fully apparent from the following detailed description when the same is read in connection with the accompanying drawings.

BRIEF DESCRIPTION OF THE DRAWINGS

FIG. 17 is a perspective exploded view of the principal portion of the seventh embodiment of the liquid ejector, FIGS. 18 and 19 are partially cutaway enlarged front views of eighth and ninth embodiments of the liquid ejector, FIG. 20 is a sectional view of a modified embodiment of a takeout construction of the optical fiber at the apparatus body, FIG. 21 is a sectional view of a joint construction of divided liquid feed pipes and optical fibers, FIG. 22 is a sectional view of a modified embodiment of the joint construction of divided liquid feed pipes and optical fibers corresponding to FIG. 21, FIGS. 23 and 24 are partial sectional views of modified embodiments of a fixture for the optical fiber at the joint construction.

DETAILED DESCRIPTION OF THE PREFERRED EMBODIMENTS

Figure 1:
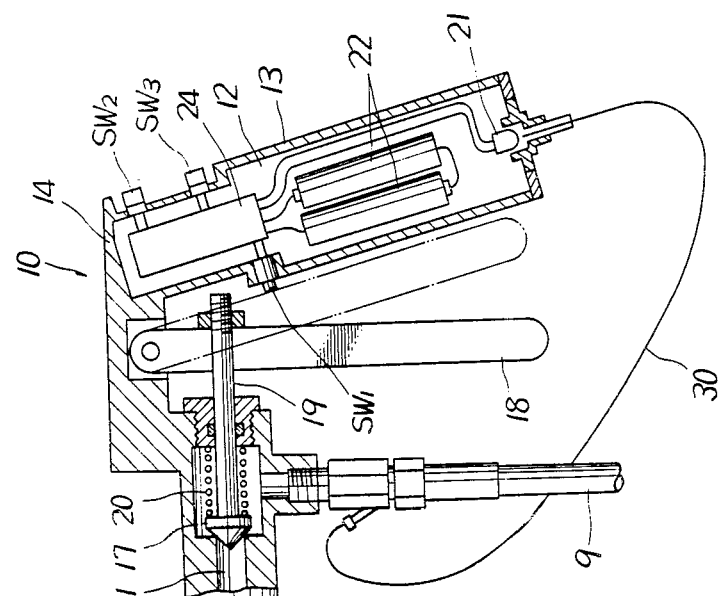
FIG. 1 is a schematic view illustrating an embodiment of a liquid ejection apparatus of the invention.

A liquid ejection apparatus as shown in FIG. 1 ejects a washing liquid to wash, for example, a body of an automobile. The apparatus includes an apparatus body 1 provided with a motor 2, a pump 3 driven thereby, a washing medicine injector 4, a hot water supply boiler 5, a water tank 6, and an operation control unit 8 for operating these pieces of operating equipment.

A discharge conduit 3a of pump 3 connects with a liquid feed pipe 9, the utmost end thereof connects with a liquid ejector 10, and one optical fiber 30 is disposed within and along liquid feed pipe 9 and between apparatus body 1 and liquid ejector 10.

Figure 2:
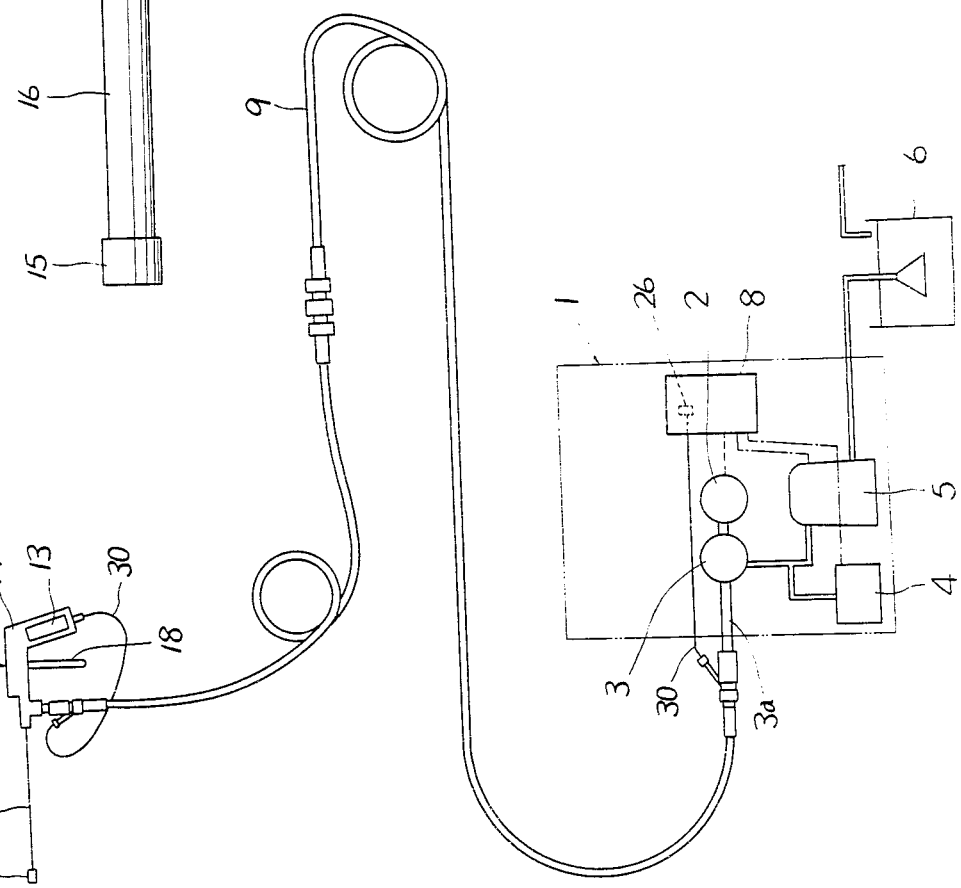
FIG. 2 is a partially cutaway enlarged front view of a first embodiment of a liquid ejector of the FIG. 1 embodiment.

Liquid ejector 10, as shown in FIG. 2, comprises a liquid ejector body 14 having in the front thereof a liquid ejecting conduit 11 jointed with liquid feed pipe 9 and at its rear a end a nozzle 15. Liquid ejector body 14 is provided in the front thereof with an open-close valve 17 for cutting off the communication with lance 16 at liquid ejecting conduit 11, and at an intermediate portion with a valve operating lever 18 for operating in association therewith open-close valve 17 through a rod 19 and a spring 20.

Within cavity 12 of grip 13 are housed a light emitting element 21 peferably comprising a light emitting diode for transmitting an optical signal to optical fiber 30, a power source 22 comprising dry cells, and a transmission control circuit 24 to be discussed in detail below. Also, ejector body 14 is provided with a plurality of switches $SW_1$, $SW_2$ and $SW_3$ corresponding to operating equipment 2, 5 and 4 respectively.

Switch $SW_1$ corresponding to motor 2 is a push bottom switch provided at the front side of grip 13, positioned opposite to valve operating lever 18, and turned on by swinging motion thereof. In brief, switch $SW_1$ is adapted to be on when open-close valve 17 is open.

Switch $SW_2$ corresponds to boiler 5, and switch $SW_3$ corresponds to washing medicine injector 4, these switches $SW_2$ and $SW_3$ using on-off switches respectively.

Optical fiber 30 is taken out from liquid feed pipe 9 at the entrance and the exit thereof, in other words, at the apparatus body 1 side and the liquid ejector 10 side, and faces at one end to light emitting element 21 at ejector body 14 and at its other end to a light receiving element 26 composed preferably of a phototransistor and provided at operation control unit 8.

Figure 3:
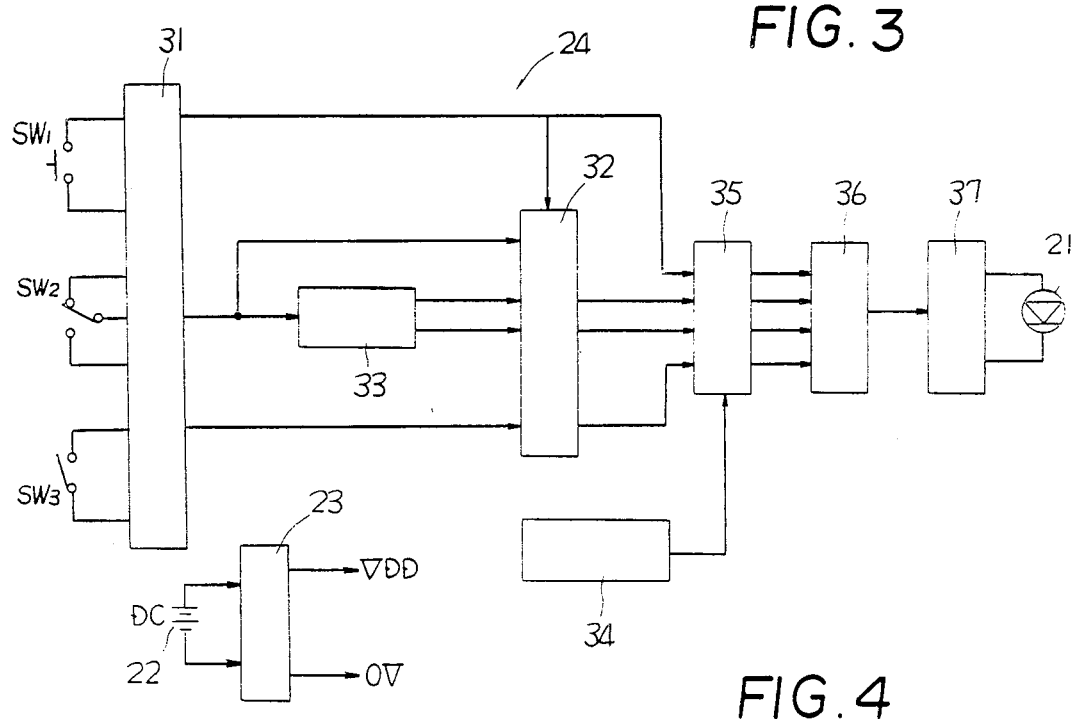
FIG. 3 is a circuit diagram of a transmission control circuit provided at the liquid ejector.

Transmission control circuit 24 provided at liquid ejector 10, as shown in FIG. 3, comprises an input circuit 31 connected to switches $SW_1$, $SW_2$, $SW_3$, an output control circuit 32 for outputting on-operation of switch $SW_3$ only when switch $SW_1$ is on, a one-shot circuit 33 provided corresponding to switch $SW_2$ in order to output on-operation of switch $SW_2$ independently of turning on or off of switch $SW_1$, a gate 35 given an output from a power source closing processing circuit 34 to prevent a malfunction when the power source is switched, a switching circuit 36 for controlling the output signal corresponding to on-operation of respective switches $SW_1$, $SW_2$ and $SW_3$, and a transmitting integrated circuit 37 for controlling, on the basis of the output signal from switching circuit 36, the optical signal transmitted in a pulsating manner from light emitting element 21. In addition, in FIG. 3, a reference numeral 23 designates a power circuit of power source 22.

Operation control unit 8 at apparatus body 1 is provided with an output circuit 40 other than light receiving element 26 receiving the optical signal from light emitting element 21 through optical fiber 30, which circuit 40 discriminates the optical signal received by light receiving element 26, converts the optical signal into an electric signal corresponding to respective operating equipment 2, 4 and 5, and outputs thereto the same.

Figure 4:
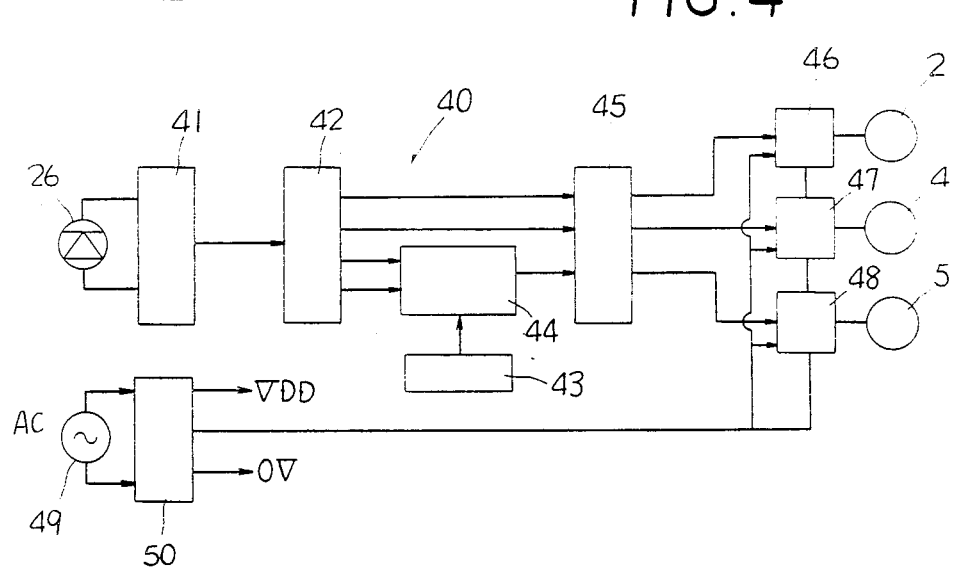
FIG. 4 is a circuit diagram of an output circuit provided at the apparatus body.

Output circuit 40, as shown in FIG. 4, comprises an input signal amplifier 41 connected to light receiving element 26 to amplify the optical signal, an input integrated circuit 42 which discriminates the optical signal and converts it into a plurality of electric signals, a flip-flop 44 which connects with a power source closing reset circuit 43 and discriminates on-off operation of switch $SW_2$, an output amplifier circuit 45 for amplifying the electric signal, and relays 46, 47 and 48 connected to the output end of amplifier circuit 45 and for controlling the operating units. In addition, in FIG. 4, a reference numeral 49 designates an A.C. power source and 50 designates a power circuit therefor.

Figure 5:
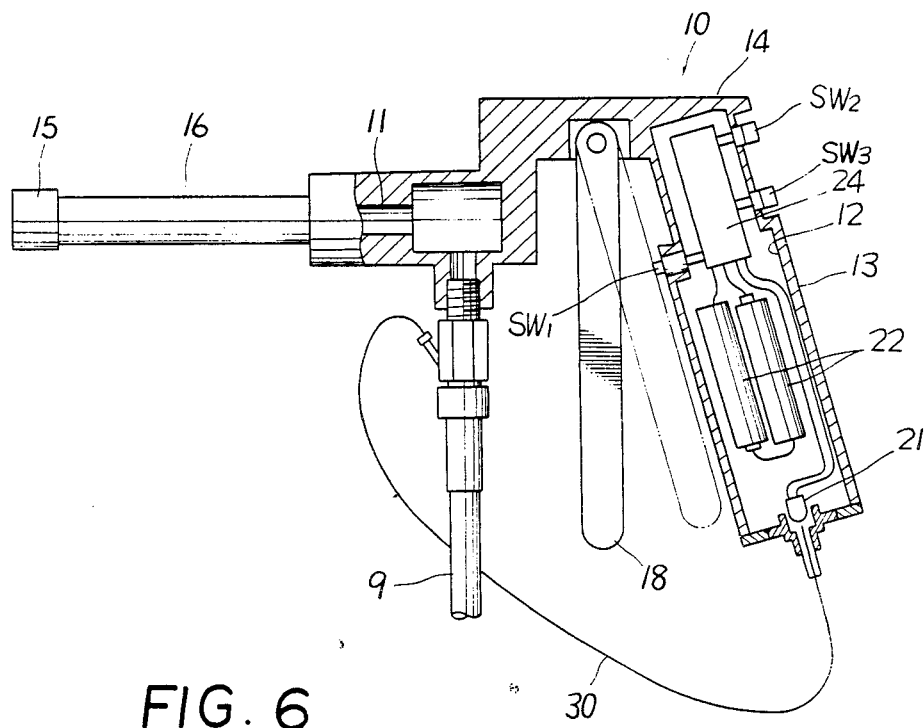
FIGS. 5 and 6 are partially cutaway enlarged front views of second and third embodiments of the liquid ejector.
Figure 6:
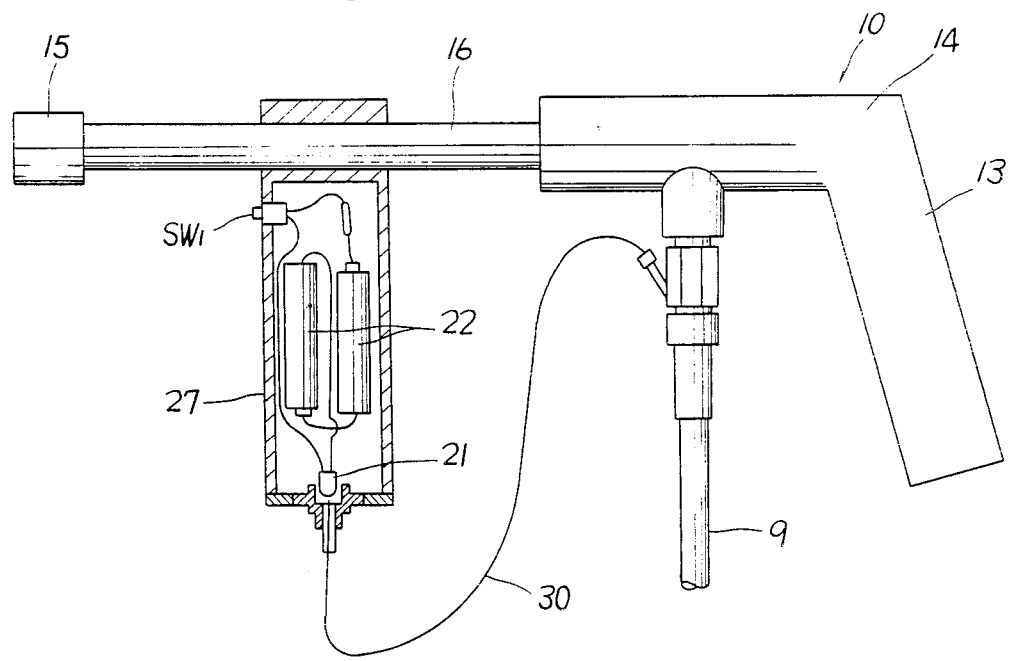

Alternatively, open-close valve 17 may be provided elsewhere than at liquid ejector 10 as shown in FIG. 5. Also, a hollow auxiliary grip 27 separate from grip 13 may be provided as shown in FIG. 6, and power source 22, switch $SW_1$ and light emitting element 21 may be provided at grip 27.

Figure 7:
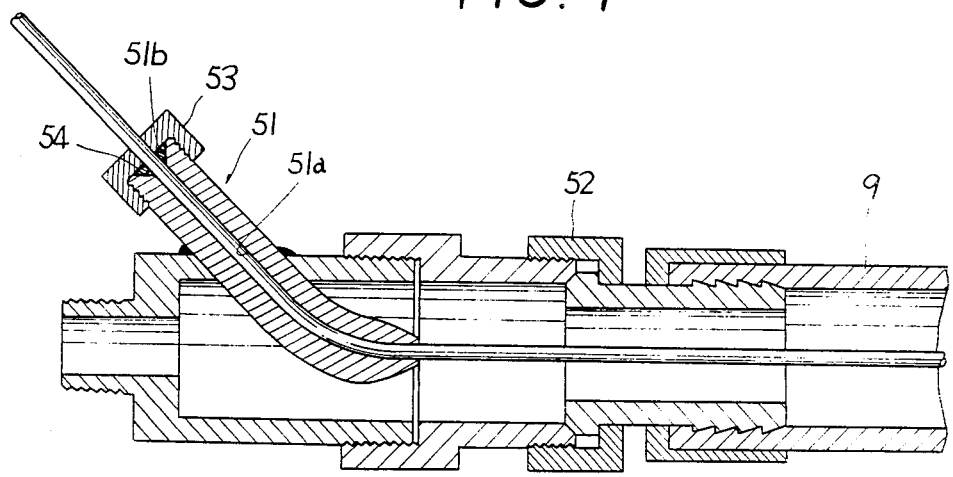
FIG. 7 is a sectional view illustrating a takeout construction of an optical fiber at the liquid ejector.

Optical fiber 30 is taken out from liquid feed pipe 9 such that, for example, as shown in FIG. 7, a take-out member 51 having an insertion bore 51a into which optical fiber 30 is inserted is jointed to one end of liquid feed pipe 9 by a joint means, such as a cap nut 52, so as to take-out optical fiber 30 to the exterior through insertion bore 51a. A cap nut 53 screws with the end of takeout member 51, a conical recess 51b is provided at the end face of the same, and a seal ring 54 is provided within recess 51b, so that cap nut 53 is screwably tightened to deform seal ring 54 so as to seal insertion bore 51a and hold optical fiber 30, thereby preventing optical fiber 30 from moving.

Figure 8:
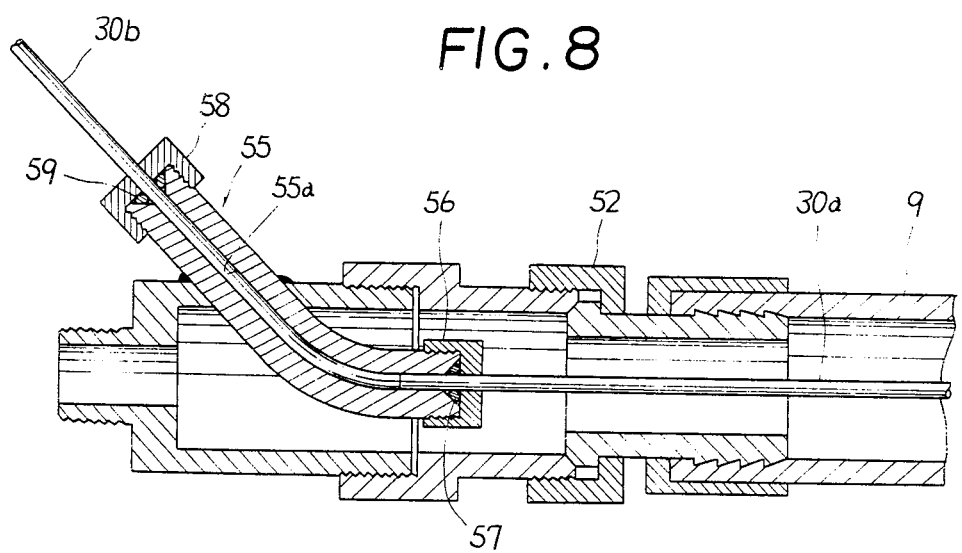
FIG. 8 is a sectional view illustrating a modified takeout construction of the optical fiber at the liquid ejector corresponding to FIG. 7.

In addition, optical fiber 30 may be taken out from liquid feed pipe 9 such that, as shown in FIG. 8, optical fiber 30 is cut at the takeout side and the end of optical fiber 30a at the liquid feed pipe side is inserted into an entrance of insertion bore 55a at a takeout member 55 so that a cap nut 56 and a seal ring 57 are used to hold optical fiber 30a to takeout member 55, the end of optical fiber 30b at the takeout side is inserted into insertion bore 55a from the exit thereof, so that the end face of optical fiber 30b abuts against that of optical fiber 30a, and a cap nut 58 and a seal ring 59 seal insertion bore 55a and hold optical fiber 30b.

Figure 9:
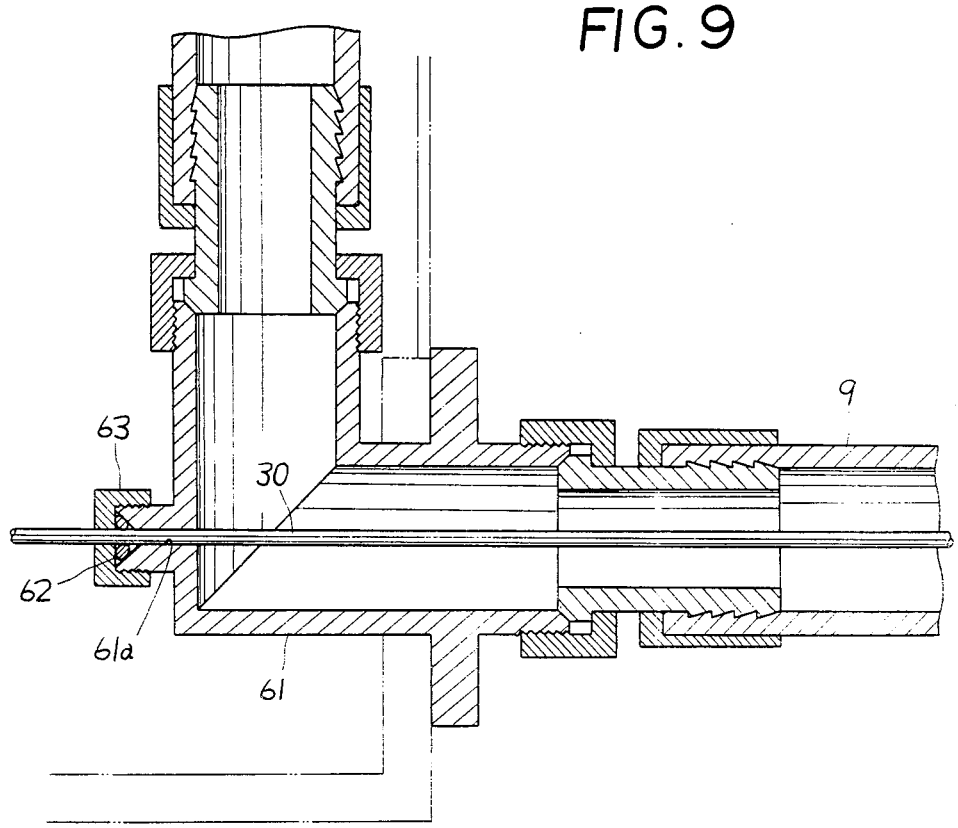
FIG. 9 is a sectional view illustrating a takeout construction of the optical fiber at the apparatus body.

Also, optical fiber 30 may be taken out from apparatus body 1 such that, as shown in FIG. 9, a substantially L-shaped takeout member 61 having an insertion bore 61a extending axially of liquid feed pipe 9 is jointed to the end thereof so that optical fiber 30 disposed in liquid feed pipe 9 is taken out so as to pass through takeout member 61 and is also not bent but linear, and a cap nut 63 and a seal ring 62 are mounted on takeout member 61 at the exit of insertion bore 61a, thereby sealing insertion bore 61a and holding optical fiber 30.

Figure 10:
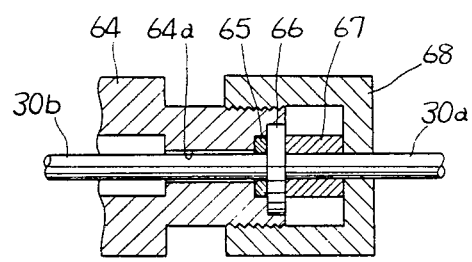
FIG. 10 is a sectional view illustrating a seal construction at the takeout portion of the optical fiber from a liquid feed pipe.
Figure 11:
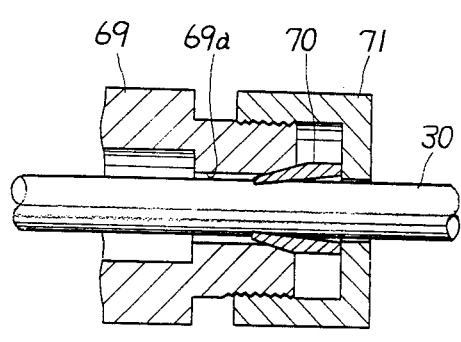
FIGS. 11 and 12 are enlarged sectional views exemplary of modified seal constructions corresponding to FIG. 10, FIGS. 13 through 16 are partially cutaway enlarged front views of fourth through seventh embodiments of the liquid ejector.
Figure 12:
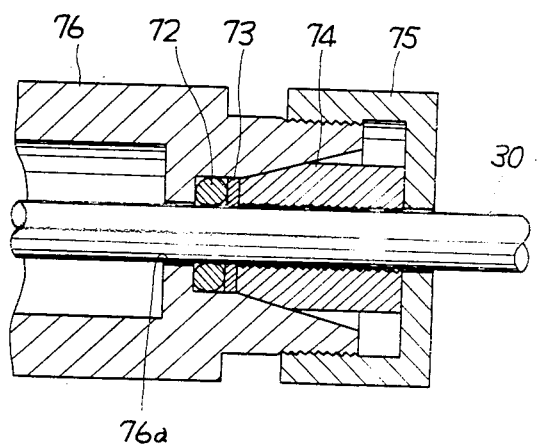

Alternatively, the optical fiber takeout portion may be sealed and optical fiber 30 may be held as shown in FIGS. 10 through 12.

In FIG. 10 corresponding to FIG. 8, optical fiber 30a disposed in liquid feed pipe 9 is inserted into an insertion bore 64a at a takeout member 64, and a seal ring 65 and a light transmission plate 66, such as a convex lens, for urging seal ring 65, are provided at the end of insertion bore 64a. A sleeve 67 is fixed by bonding to the end of taken-out optical fiber 30b so that a cap nut 68 screws with takeout member 64 at the exit of insertion bore 64a so as to urge light transmission plate 66 by sleeve 67 to elastically deform seal ring 65, thereby holding optical fiber 30a.

In FIG. 11, a sleeve 70 having a tapered surface is inserted into the outer end of an insertion bore 69a of a takeout member 69 and a cap nut 71 screwably tightens takeout member 69 to allow sleeve 70 to encroach at the edge onto optical fiber 30, thereby sealing insertion bore 69a and holding optical fiber 30.

In FIG. 12, a seal ring 72, a backup ring 73 for urging seal ring 72, a sleeve 74 having a tapered surface and a slit thereon, and a cap nut 75 are used, with cap nut 75 screwably tightening a takeout member 76 at the outer end of an insertion bore 76a to deflect the tapered portion of sleeve 74, thereby holding optical fiber 30 and sealing bore 76a by seal ring 72.

During operation of the liquid ejection apparatus of the invention, switch $SW_2$ is turned on initially so that an optical signal corresponding thereto is received by light receiving element 26 through optical fiber 30, and boiler 5 starts its operation through output circuit 40.

Next, switch $SW_3$ is turned on, but an optical signal corresponding thereto is not output until output control circuit 32 turns on switch $SW_1$. Under this condition, a user grips lever 18 to open valve 17 and turn on switch $SW_1$.

Hence, switch $SW_1$ is on and an optical signal corresponding to switch $SW_3$ is output, and continuously, the optical signal corresponding to $SW_1$ is output.

Accordingly, the optical signals are received by light receiving element 26 through optical fiber 30, washing medicine injector 4 operates and motor 2 is driven through output circuit 40, and washing liquid at a predetermined temperature and mixed with the washing medicine is fed and ejected from nozzle 15.

Lever 18, when released to temporarily stop the washing work, moves away from switch $SW_1$ and turns it off, and no optical signal corresponding to switches $SW_1$ and $SW_3$ are output from light emitting element 21 to thereby stop pump 3 and washing medicine injector 4.

Open-close valve 17, after stopping of pump 3 and washing medicine injector 4 as described above, is restored by spring 20 to close ejection conduit 11, at which time pump 3 has already stopped, whereby the pressure in liquid feed pipe 9 is not raised. Since open-close valve 17 is closed, unnecessary washing liquid does not flow out and also even when transmission control circuit 24 or output circuit 40 malfunctions, there is no risk that washing liquid will be carelessly ejected.

Alternatively, optical fiber 30 may be disposed outside liquid feed pipe 9. In this embodiment, it is preferable that optical fiber 30 be bonded onto the surface of pipe 9 by a bonding means, such as an adhesive, a thermal contraction tube, or a binding band. Also, optical fiber 30 may be inserted into a conduit separate from the liquid feed conduit at molded liquid feed pipe 9, or may be embedded therein when liquid feed pipe 9 is molded. Thus, the means for disposing optical fiber 30 is not particularly defined.

Figure 13:
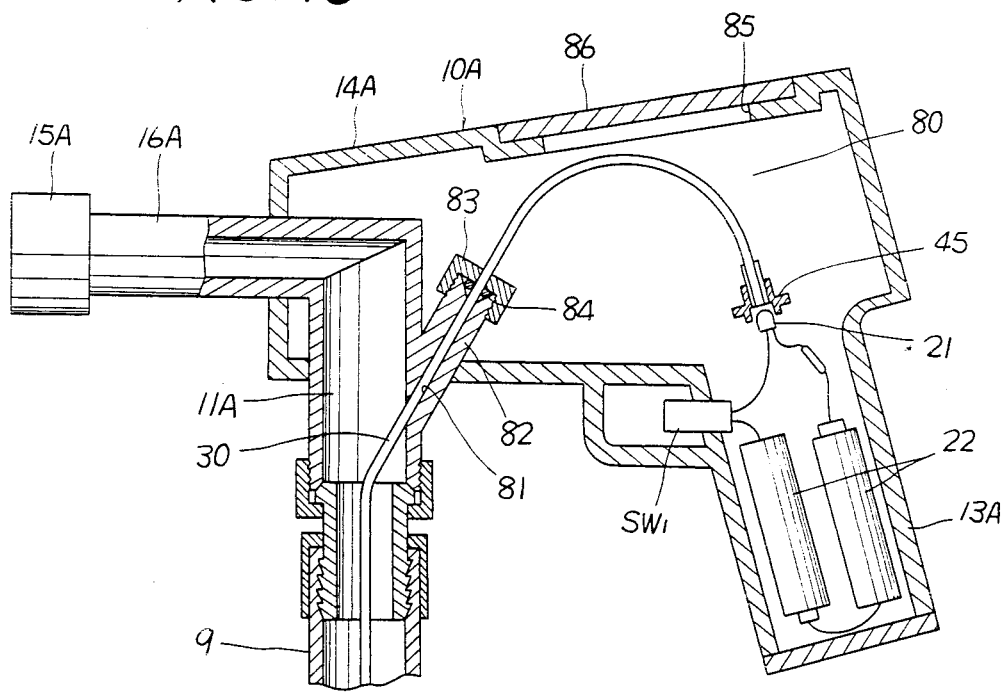

Alternatively, optical fiber 30 may be disposed as shown in FIG. 13, such that ejector body 14A at a liquid ejector 10A may be provided with a cavity 80 partitioned from a liquid ejection conduit 11A and with a takeout conduit 81, so that optical fiber 30 may be guided therethrough into cavity 80, whereby optical fiber 30 may not be exposed to the exterior but face toward a light emitting element 21 provided at body 14A.

Thus, optical fiber 30 is protected from coming into contact with foreign objects, whereby there is no risk that it will be damaged thereby or hinder the washing operation. Takeout conduit 81 is formed at a takeout cylinder 82 integral with a wall forming liquid ejection conduit 11A, and a cap nut 83 screws the utmost end of takeout cylinder 82 to fix optical fiber 30. A seal ring 84 seals conduit 81.

In a fourth embodiment in FIG. 13, at the upper wall of body 14A is provided a window 85 through which cavity 80 is open to the exterior and a lid 86 therefor is provided to make exchangeable light emitting element 21 and power source 22 housed in cavity 80.

In addition, the liquid ejector forming therein cavity 80 can be modified as shown in FIGS. 14 through 19.

Figure 14:
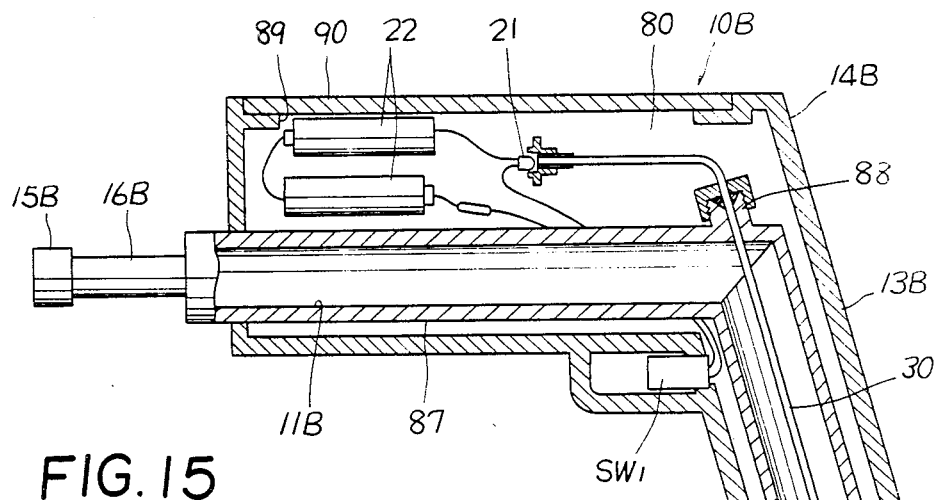

In detail, in a fifth embodiment shown in FIG. 14, a liquid ejection conduit 11B at a liquid ejector 10B is formed in the shape of an inverted substantially L-shaped tube 87 and a hollow ejector body 14B is assembled outside tube 87 in a covering manner, thereby forming cavity 80. An optical fiber takeout cylinder 88 is provided at tube 87, so that optical fiber 30 is taken out from conduit 11B into cavity 80, a cap nut is fixed to cylinder 88 and a seal ring seals it, light emitting element 21 and power source 22 are housed in cavity 80, and a window 89 is provided and closed by a lid 90, which are similar to the fourth embodiment in FIG. 13.

Figure 15:
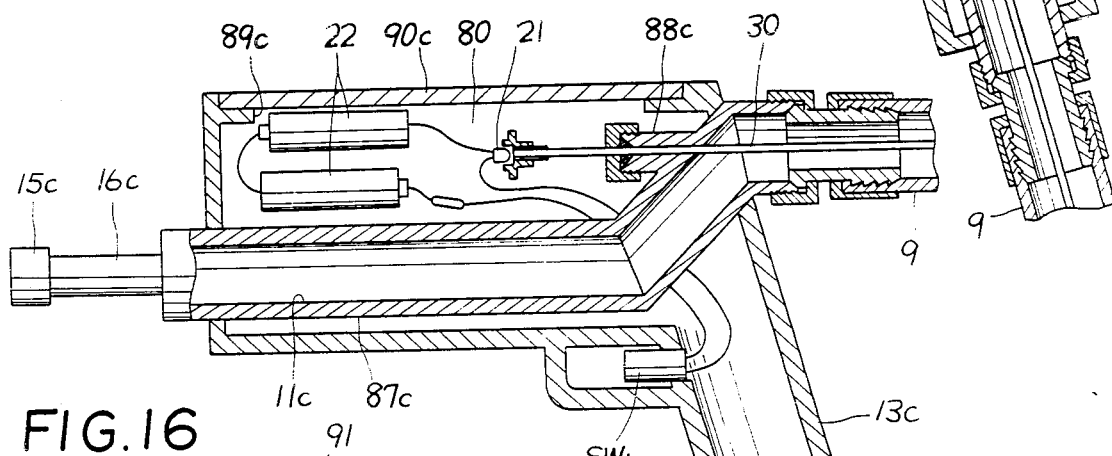

A sixth embodiment in FIG. 15 is a modification of the fifth embodiment, wherein a tube 87c forming liquid ejection conduit 11C has a modified configuration and other components are the same as those of the fifth embodiment.

Figure 16:
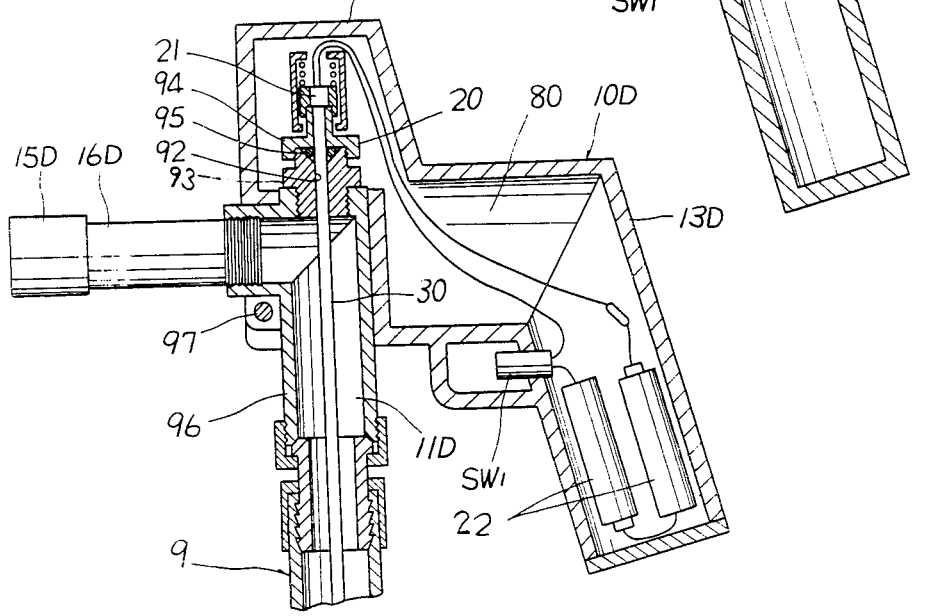

Furthermore, in a seventh embodiment shown in FIGS. 16 and 17, a liquid ejector body 14D is substantially L-shaped, and a projection 91 projecting upwardly is provided at the front of body 14D and on the extension line of liquid ejection conduit 11D. Optical fiber 30 inserted into liquid ejection conduit 11D is guided linearly into projection 91, and a takeout cylinder 93 having a liquid takeout conduit 92 screws with a member 96 forming liquid ejection conduit 11D. Optical fiber 30 is fixed to takeout cylinder 93 by use of a fixture 94, and takeout conduit 92 is sealed by a seal ring 95. Light emitting element 21 is held to fixture 94 to be opposite to optical fiber 30 fixed to fixture 94.

In addition, member 96 is separate from liquid ejector body 14D and mounted detachably thereto by tightening a mounting bolt 97 with a nut 98 as shown in FIG. 17.

Alternatively, two optical fibers may be used, in which a liquid ejector is constructed as shown in FIGS. 18 and 19.

In FIG. 18, two optical fibers 30A and 30B are disposed in liquid feed pipe 9, guided into a cavity 80E at an ejector body 14E of a liquid ejector 10E, and are opposite at one of their ends to each other, and an interrupting plate 100 is interposed between these opposite ends to enter and leave therebetween.

In this embodiment, the light emitting element is provided at apparatus body 1. Interrupting plate 100 enters between the ends of optical fibers 30A and 30B to cut off transmission therebetween and leaves between the same to enable transmission of optical signals. In FIG. 18, a lever 18E is provided at ejector body 14E and supports interrupting plate 100.

In a ninth embodiment in FIG. 19, a lever 18F provided at an ejector body 14F has a reflecting surface 101, and optical fibers 30A and 30B are opposite at one of their respective ends to reflecting surface 101 such that they are exposed.

Also, the takeout construction for optical fiber 30 at apparatus body 1 may alternatively be as shown in FIG. 20.

In FIG. 20, on a frame 1F at apparatus body 1 is mounted through a flange 104 a substantially L-shaped joint pipe 103 connecting with ejection conduit 3a. An optical fiber takeout member 108 which has a joint 105 jointed with liquid feed pipe 9, a mounting flange 106 opposite to flange 104, and a holding cylinder 107 for holding optical fiber 30 disposed in liquid feed pipe 9, is mounted to joint 103 such that holding cylinder 107 passes through joint pipe 103. A fixture 109 screws with the utmost end of holding cylinder 107 through a seal ring 110, thereby fixing optical fiber 30 held to holding cylinder 107. A holder 111 holding light receiving element 26 is mounted in the front of fixture 109 through a stay 112.

In this embodiment, optical fiber 30 can be linearly taken out and light receiving element 26 is easy to hold.

In addition, in FIG. 20, a reference numeral 113 designates a spring to bias to the end face of optical fiber 30 the light receiving element 26 held by holder 111.

Alternatively, the liquid feed pipe connecting apparatus body 1 and liquid ejector 10 may be divided into two pipes 9A and 9B.

In this embodiment, divided pipes 9A and 9B and divided optical fibers 300A and 300B disposed therein are connected as follows.

Referring to FIG. 21, a first joint 114 is mounted on first liquid feed pipe 9A, a second joint 115 on second liquid feed pipe 9B, and a fiber connector 117 having its center an insertion bore 116 into which first optical fiber 300A and second optical fiber 300B are inserted and abut against each other is provided. A flange 119 having a plurality of through bores 118 is provided at connector 117 and fixedly sandwiched between first and second joints 114 and 115. Fixtures 120 and 121 for fixing optical fibers 300A and 300B screw with both axial ends of connector 117 through seal rings 122 and 123.

Near respective ends of joints 114 and 115 are provided supports 124 and 125 of supporting optical fibers 300A and 3000B at the diametrical centers of joints 114 and 115 respectively. In this embodiment, it is preferable to provide snap rings 126 and 127 in contact with supports 124 and 125 to determine the lengths of optical fibers 300A and 300B projecting from liquid feed pipes 9A and 9B respectively.

In addition, in FIG. 21, reference numerals 128 and 129 designate joint pipes press-fitted into liquid feed pipes 9A and 9B, and reference numerals 130 and 131 designate flanged nuts for coupling joints 128 and 129 with first and second joint pipes 114 and 115. Reference numeral 132 designates a sealing member.

Alternatively, first and second joints 114 and 115 may be integral with each other as shown by reference numeral 140 in FIG. 22.

In FIG. 22, a connector 117A for optical fibers 300A and 300B is held to joint 140 by a shoulder 141 thereon and a snap ring 143 fitted into an annular groove 142 on the inner surface of the joint 140.

Figure 23:
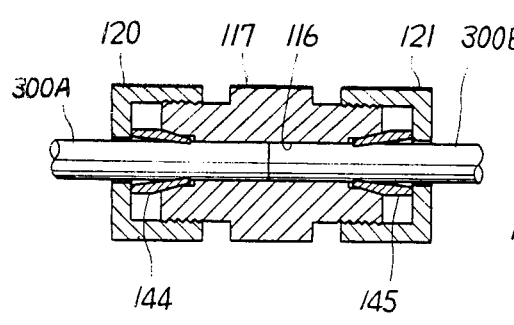
Figure 24:
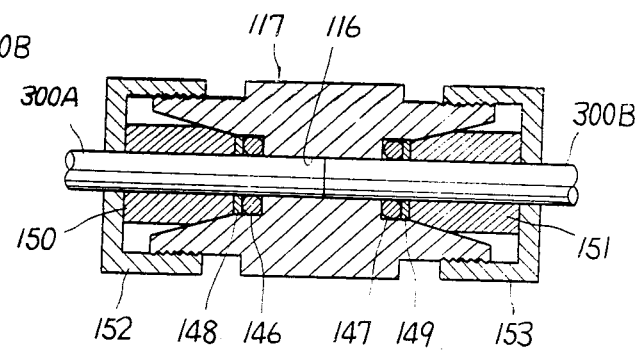

Also, fixtures 120 and 121 screw with respective connectors 117 and 117A to elastically deform seal rings 122 and 123, thereby fixing optical fibers 300A and 300B to respective connectors 117 and 117A. Alternatively, elastically deformable sleeves 144 and 145 may be used as shown in FIG. 23, or O-rings 146 and 147, backup rings 148 and 149, and sleeves 150 and 151 each having a tapered surface and a slit, may as shown in FIG. 24, be used and fixtures 152 and 153 may screw with connector 117 as shown in FIG. 24.

Figure 25:
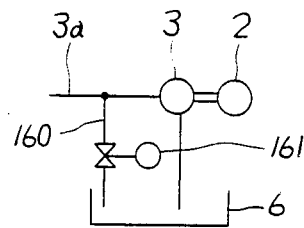
FIG. 25 is an illustration of another example of liquid feed control of the liquid feed pipe.

Alternatively, an electromagnetic clutch may be provided at a power transmitting system from motor 2 to pump 3 and controlled to be on-off, or, as shown in FIG. 25, a discharge pipe 3a of pump 3 may be provided with a return pipe 160, into which a solenoid valve 161 may be interposed, thereby opening and closing solenoid valve 161.

Figure 26:
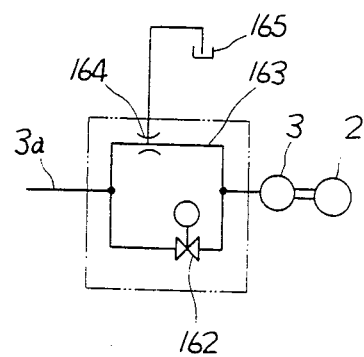
FIG. 26 is an illustration of another embodiment illustrating medicine injection control.

Alternatively, as shown in FIG. 26, a solenoid valve 162 may be interposed in discharge pipe 3a of pump 3, a by-pass 163 may be provided to by-pass solenoid valve 162, and a medicine tank 165 may be connected to by-pass 163 through an injector 164, so that solenoid valve 162 only may be operated to close, thereby causing the pressurized liquid discharged from pump 3 to flow into by-pass 163 and injecting the medicine from tank 165 into by-pass 163, thus ejecting a mixture of the washing liquid and medicine.

Although several embodiments have been described, they are merely exemplary of the invention and not to be construed as limiting, the invention being defined solely by the appended claims.

We claim:

1. A liquid ejection apparatus, comprising:
   (a) an apparatus body including a liquid tank, a pump means for sucking out liquid contained in said tank and discharging said liquid, a boiler means for heating said liquid prior to its being sucked into said pump, and a washing agent injection means for injecting a washing agent into said liquid prior to its being sucked into said pump;
   (b) a liquid ejector comprising a liquid ejector housing including at a front portion thereof a liquid ejection conduit and at a rear portion thereof a hand grip portion, said grip portion including a cavity, a hollow lance fluidly connected at one end with said liquid ejection conduit, a nozzle connected to another end of said lance, an open-close valve disposed in said liquid ejector housing for opening and closing said liquid ejection conduit, and an operating lever means connected to said liquid ejector housing for opening and closing said open-close valve;
   (c) a liquid feed pipe means for fluidly interconnecting said pump means and said liquid ejector;
   (d) an optical fiber means disposed between said apparatus body and said liquid ejector;
   (e) said grip portion including a first switch means for switching between ON and OFF positions responsive to operation of said operating lever to alternately enable and prevent fluid flow discharging from said pump means, a second switch means for alternately enabling and preventing actuation of said boiler means and a third switch means for alternately enabling and preventing actuation of said washing agent injection means;
   (f) said cavity having disposed therein a light emitting means for transmitting an optical signal through said optical fiber means, an electrical power source for powering said light emitting means, and a signal transmitter control circuit for controlling optical signals output from said light emitting means responsive to ON conditions of each of said switches; and
   (g) said apparatus body further comprising an operation control means responsive to said switches, for controlling operations including (i) supply of liquid from said pump means to said liquid feed pipe means, (ii) actuation of said boiler means, and (iii) injection of said washing agent by said washing agent injection means, said operation control means comprising a light receiving means for receiving an optical signal output from said optical fiber means corresponding to said ON conditions of each of said switches transmitted to said optical fiber means from said light emitting means, and an output circuit, responsive to said light receiving means, for discriminating said optical signal received by said light receiving means and converting said optical signal into an electrical signal which is supplied to said operation control means to control (i) supply of liquid from said pump means to said liquid feed pipe means, (ii) actuation of said boiler means, and (iii) injection of said washing agent by said washing agent ejection means.

2. A liquid ejection apparatus according to claim 1, wherein said cavity is partitioned from said liquid ejection conduit and said apparatus further comprises a takeout conduit for said optical fiber means extending from said ejection conduit to said cavity and disposed in said liquid feed pipe means, so that said optical fiber means is guided from said takeout conduit into said cavity, said ejector body being provided with said control means which transmits or cuts off said optical signal to or from said optical fiber means guided into said cavity.

3. A liquid ejection apparatus according to claim 1, wherein said apparatus body is provided with a connecting pipe and said pump means includes a discharge conduit connected to said connecting pipe, said apparatus further comprising an optical fiber takeout member having a joint connected to said liquid feed pipe means and a holding cylinder for holding said optical fiber means disposed in said liquid feed pipe means, wherein said holding cylinder passes through said connecting pipe and is provided at its utmost end side with a fixture for said optical fiber means and a holder for said light receiving element.

4. A liquid ejection apparatus according to claim 1, wherein said liquid feed pipe means comprises a first liquid feed pipe and a second liquid feed pipe and said optical fiber means comprises a first optical fiber and a second optical fiber, and wherein a connection unit is provided with a first joint mounted on said first liquid feed pipe, a second joint mounted on said second liquid feed pipe, and an optical fiber connector having an insertion bore in which said a first optical fiber disposed in said first liquid feed pipe and said second optical fiber disposed in said second liquid feed pipe are inserted and abut against each other, said connector being provided with holding means comprising fixtures for fixing said first and said second optical fibers and for holding said connector within said first and said second joints.

* * * * *